US006562288B2

(12) United States Patent
Park

(10) Patent No.: US 6,562,288 B2
(45) Date of Patent: May 13, 2003

(54) METHOD AND APPARATUS FOR MANUFACTURING CUTTING BLADES, AND A CUTTING BLADE MANUFACTURED BY THE SAME

(76) Inventor: Rin Soon Park, Yongsang Apartment 1-401, 150-3 Wonjong-dong, Ojung-gu, Puchon, Kyoungki-do (KR)

( * ) Notice: Subject to any disclaimer, the term of this patent is extended or adjusted under 35 U.S.C. 154(b) by 3 days.

(21) Appl. No.: 09/733,983

(22) Filed: Dec. 12, 2000

(65) Prior Publication Data

US 2002/0057981 A1 May 16, 2002

(30) Foreign Application Priority Data

Nov. 13, 2000 (KR) .......................................... 2000-67055

(51) Int. Cl.[7] .................................................. B22F 7/08
(52) U.S. Cl. .................................. 419/8; 419/9; 419/11; 425/78
(58) Field of Search ....................... 419/8, 9, 11; 425/78

(56) References Cited

U.S. PATENT DOCUMENTS

| 4,593,776 A | * | 6/1986 | Salesky | 175/375 |
| 4,630,692 A | * | 12/1986 | Ecer | 175/330 |
| 4,747,999 A | * | 5/1988 | Hasselstrom | 419/49 |
| 6,063,333 A | * | 5/2000 | Dennis | 419/6 |

* cited by examiner

Primary Examiner—Daniel J. Jenkins
(74) Attorney, Agent, or Firm—Dickstein Shapiro Morin & Oshinsky, LLP

(57) ABSTRACT

Disclosed are a method for manufacturing cutting blades with a shortened manufacturing process and an apparatus for manufacturing cutting blades with a single manufacturing facility, as well as a cutting blade having cutting segments in which diamond particles are uniformly distributed. The method comprises the steps of preparing diamond-metal powder mixture by mixing diamond particles of a predetermined size and metal powder of a predetermined ingredient and size, supporting a disk-shaped steel core for cutting blade under the lower portion of a forming die consisting at least one vertically reciprocating upper punch and a lower die assembly having at least one forming pattern of a cross-sectional shape corresponding to the upper punch, forming the mixture into cutting segments of a predetermined shape by filling a predetermined amount of the mixture into the forming pattern and pressing the mixture in the forming pattern, sintering the metal powder in the mixture by heating the mixture while its forming in the forming pattern, and welding the cutting segments, by said heating, to the periphery of the steel core placed in advance at the lower portion of the forming pattern. The apparatus comprises at least one vertically reciprocating upper punch, a lower die assembly having at least one forming pattern of a cross-sectional shape corresponding to the upper punch for filling the diamond-metal powder mixture therein and forming the mixture into a predetermined shape, and a supporting device for supporting a disk-shaped steel core having a predetermined periphery thereof positioned at the lower portion of the forming pattern. The cutting blade comprises cutting segments which are made by forming and sintering into a predetermined shape a mixture of metal powder of a predetermined ingredient and size and diamond-metal powder granules preformed by coating metal powder of a predetermined ingredient and size around diamond particles of a predetermined size.

14 Claims, 10 Drawing Sheets

METHOD AND APPARATUS FOR MANUFACTURING CUTTING BLADES, AND A CUTTING BLADE MANUFACTURED BY THE SAME

BACKGROUND OF THE INVENTION

1. Field of the Invention

The present invention relates to a cutting blade, and in particular, to a method and an apparatus for manufacturing high speed cutting blades used for cutting stones, metal, concrete, asphalt, bricks, earthen pipes, etc., and a cutting blade manufactured by the same.

2. Description of the Related Art

In a building site or a civil engineering site, cutting blades of a disk shape are generally used as cutting tools for cutting stones, metal, concrete, asphalt, bricks, earthen pipes, etc. Each of those cutting blades comprises a disk-shaped steel core with a predetermined thickness made of a high speed tool steel such as carbon tool steel, low carbon tool steel or the like, and a plurality of cutting segments made of a diamond-metal powder mixture, usually, by mixing diamond particles and metal powder of a specific ingredient, forming the mixture into a predetermined shape and sintering the same at a high temperature. The cutting segments are fixedly attached to the periphery of the disk-shaped steel core at regular intervals, usually by welding.

As shown in FIG. 1, the conventional method for manufacturing those cutting blades mainly comprises the steps of: preparing a diamond-metal powder mixture by mixing diamond particles having a predetermined size with metal powder having a predetermined ingredient and size; forming the diamond-metal powder mixture into cutting segments of a predetermined shape by pressing the mixture in a forming pattern of a forming die using pressurized punching means; sintering the formed cutting segments in a separate sintering furnace; and welding the sintered cutting segments to the periphery of the disk-shaped steel core at regular intervals using a separate welding apparatus. Each manufacturing step of the conventional method is independently performed in a separate station, respectively.

In addition, before welding the sintered cutting segments to the periphery of the steel core, the conventional method for manufacturing the cutting blades further comprises the steps of: barrel-finishing to remove burrs or flashes undesirably formed at the peripheral edges of the cutting segments in the forming step; and radius grinding to conform the inner curvature of the sintered cutting segments to the outer curvature of the periphery of the steel core to which those cutting segments are to be welded.

In general, upon completion of the manufacturing process by completely welding the cutting segments throughout the periphery of the disk-shaped steel core at regular intervals, further steps of dressing the surfaces of the cutting segments, and painting or marking on the surface of the cutting blade may optionally be performed.

According to the conventional method, each step of manufacturing is independently performed using separate apparatus, equipments or devices, such as forming die, sintering furnace, barrel-finishing machine, radius grinder, and welding machine, which are separately installed in different places.

FIG. 2 schematically illustrates a typical forming die for forming the cutting segments in a conventional apparatus for manufacturing the cutting blades. Referring to FIG. 2, in general, the forming die comprises: an upper press having an upper punch assembly 11 consisting of a plurality of vertically reciprocating punches 12; a lower press having a lower punch assembly 13 consisting of a plurality of vertically reciprocating punches 14; and a die assembly 18 having forming patterns 15 of a cross-sectional shape corresponding to that of the punches of the upper and lower presses. On the upper surface of the die assembly 18, forming material filling feeders 16 are placed at left and right sides, respectively, so as to be movable in horizontal direction by hydraulic cylinders 17. The forming material filling feeders 16 are connected to separate powder material supplying sources (not shown).

In addition to the forming die as described above, the conventional apparatus for manufacturing the cutting blades also comprises a sintering furnace, a barrel-finishing machine, a radius grinder, a welding machine and so on, which are separately installed in different places and perform independent functions. All of them are commercially available in the field of the present invention and therefore no drawings and detailed description will be provided herein.

In manufacturing cutting blades according to the conventional method and the conventional apparatus, first, diamond-metal powder mixture is prepared by mixing diamond particles of a predetermined size and metal powder of a predetermined ingredient and size. The diamond-metal powder mixture is filled into the forming patterns 15 of the die assembly 18 of the forming die by the forming material filling feeders 16 horizontally reciprocating on the upper surface of the die assembly 18, and then formed into cutting segments of a predetermined shape by pressing the mixture in the forming pattern 15 with the vertically reciprocating punches 12 by moving down the upper punch assembly 11 of the upper press. At this time, the vertically reciprocating punches 14 of the lower punch assembly 13 of the lower press are maintained in a stationary state at a desired position.

Moving upwardly the upper punch assembly 11 apart from the forming pattern 15, and then moving upwardly the lower punch assembly 13 with a predetermined distance, the cutting segments formed as described above are released out of the forming pattern 15 by the upwardly moving punches 14 of the lower punch assembly. The formed and released cutting segments are then moved to a sintering station from the forming die, and put into a separately installed sintering furnace (not shown) and sintered under a predetermined temperature for a predetermined time period. The sintered cutting segments are then moved to a welding station and welded to the periphery of the disk-shaped steel core at regular intervals using a separate welding machine (not shown).

However, prior to welding the sintered cutting segments to the periphery of the disk-shaped steel core, it is necessary to perform barrel-finishing in a separate station so as to remove burrs or flashes undesirably formed at the peripheral edges of the cutting segments in the forming step, and radius grinding in a separate station so as to conform the inner curvature of the sintered cutting segments to the outer curvature of the periphery of the steel core to which those cutting segments are to be welded.

In the conventional method for manufacturing the cutting blades, as described above, the step of forming the cutting segments of a predetermined shape by pressing the diamond-metal powder mixture, the step of sintering the formed cutting segments, and the step of welding the sintered cutting segments to the periphery of the disk-shaped steel core are independently performed in separate stations. Furthermore, prior to welding the sintered cutting segments to the periphery of the disk-shaped steel core, the step of barrel-finishing to remove the burrs or flashes formed at the peripheral edges of the cutting segments in the forming step, and the step of radius grinding to conform the inner curvature of the sintered cutting segments to the outer curvature of the periphery of the steel core should also be independently performed in separate places. Therefore, the conventional method requires to move half-finished or intermediate products in every step of manufacturing and to perform all the steps of manufacturing at separate stations using separate apparatus, equipments or devices, and as a result, the conventional method not only consumes a long period of time for manufacturing but also incurs a considerable amount of loss in materials, energy and manpower.

The conventional manufacturing apparatus also requires, in every step of manufacturing, to use separate apparatus, equipments or devices separately installed in different stations, which results in requiring a large space or separated places to install the entire set of manufacturing apparatus, and which, throughout the entire steps of manufacturing, causes not only a troublesome to move the half-finished of intermediate products to each station but also a considerable amount of loss in materials, energy, manpower and so on.

FIG. 3 is a partial sectional view illustrating a structure of the cutting segments in a conventional cutting blade. FIG. 4 is a partially enlarged sectional view illustrating an example that the surfaces of cutting segments have been abraded during a cutting operation of the conventional cutting blade.

The conventional cutting blade is manufactured, as described above, by mixing diamond particles having a predetermined size with metal powder having a predetermined ingredient and size, forming the diamond-metal powder mixture into cutting segments of a predetermined shape by pressing the mixture in a forming pattern, sintering the formed cutting segments in a sintering furnace, and welding the sintered cutting segments to the periphery of a disk-shaped steel core.

In a cutting process, a plurality of cutting segments attached to the periphery of a cutting blade rotating at a high speed comes in contact with an object to be cut, and the object is cut by mainly a strong cutting force of the diamond particles contained in the cutting segments. In order to enhance the cutting efficiency and life cycle of the cutting blade, therefore, it is preferable to uniformly distribute the diamond particles in the cutting segments made of a diamond-metal powder mixture. Also, after using the cutting blade for a long period of time, the surfaces of the cutting segments contacting with the cutting objects is gradually abraded, and as a consequence, the diamond particles contained in the cutting segments are exposed outside. It is, therefore, preferable to maintain the diamond particles not to be fallen off from the cutting segments as long as possible.

In the conventional cutting blades, however, it is difficult to uniformly distribute the diamond particles as desired when mixing the diamond particles with the metal powder. As a result, distribution of the diamond particles in the cutting segments formed and sintered in the subsequent steps of manufacturing becomes non-uniform. Further, after using the cutting blade for a long period of time, the cutting segments become abraded and, as a result, the exposed diamond particles are easily fallen off from the cutting segments.

As shown in FIG. 3, the conventional cutting blade 20 has non-uniformly distributed diamond particles 23 and metal powder 24 in the sintered diamond-metal powder mixture of cutting segments 22 welded to the periphery of a disk-shaped steel core 21. Therefore, after using the cutting blade for a long period of time, the surfaces of the cutting segments 22 become non-uniformly abraded, thereby deteriorating the cutting efficiency and life cycle of the cutting blade.

Further, the sintered metal powder 24 having a relatively lower hardness than diamond is abraded faster than the diamond particles 23, and as a result, as shown in FIG. 4, after using the cutting blade for a long period of time, the diamond particles 23 are exposed from the surface of the cutting segments 22. In the conventional cutting blades, however, the diamond particles 23 have no strong binding force with the sintered metal powder 24 in the cutting segments, and consequently tend to be easily fallen off from the surface of the cutting segments 22 due to a shock caused by a rapid contact with an object to be cut.

Of course, as shown in FIG. 4, on the trailing sides of the diamond particles 23 exposed from the surfaces of the cutting segments 22 rotating in the arrow direction, abrasion of the sintered metal powder 24 is more slowly progressed than on the front sides of the diamond particles, and as a result, residual powder layers 25 are formed on the trailing sides of the diamond particles 23, which are slightly higher than the powder layers on the front sides of the diamond particles, so that the diamond particles 23 can be held by virtue of those residual powder layers to a certain extent. Nevertheless, the inventor of the present invention has found that the diamond particles are fallen off from the surfaces of the cutting segments when they are exposed from the surfaces about $1/10$–$1/3$ in their size. Consequently, the cutting efficiency is deteriorated, and the life cycle of the cutting blade is shortened.

SUMMARY OF THE INVENTION

It is, therefore, an object of the present invention to provide a method for manufacturing cutting blades within a short period of time and with low manufacturing cost, by reducing the manufacturing process.

It is another object of the present invention to provide an apparatus for manufacturing cutting blades requiring relatively small space for installation and capable of economically manufacturing cutting blades with a simple manufacturing process, by using not separate and independent manufacturing facilities but a single manufacturing facility.

It is still another object of the present invention to provide a cutting blade having uniform distribution of diamond particles in the sintered diamond-metal powder mixture of the cutting segments.

It is still another object of the present invention to provide a cutting blade, in which diamond particles exposed due to abrasion of the cutting segments as a result of a long time use are not easily fallen off from the cutting segments.

It is still another object of the present invention to provide cutting segments for a cutting blade having uniform distribution of diamond particles in the sintered diamond-metal powder mixture thereof.

It is still another object of the present invention to provide cutting segments for a cutting blade, from which diamond particles exposed due to abrasion as a result of a long time use are not easily fallen off.

According to an aspect of the present invention to achieve the above objects, there is provided a method for manufacturing cutting blades, each having a disk-shaped steel core with a predetermined thickness and a plurality of cutting segments made of a mixture of diamond particles and metal powder and fixedly attached to the periphery of the steel core at regular intervals, comprising the steps of: preparing a diamond-metal powder mixture by mixing diamond particles of a predetermined size with metal powder of a predetermined ingredient and size; supporting the steel core of the cutting blade under the lower portion of a forming die consisting of at least one vertically reciprocating upper punch and a lower die assembly having at least one forming pattern of a cross-sectional shape corresponding to the upper punch; forming the diamond-metal powder mixture into cutting segments of a predetermined shape by filling a predetermined amount of the mixture into the forming pattern of the forming die and pressing the mixture in the forming pattern; sintering the metal powder in the diamond-metal powder mixture of the cutting segments by heating the mixture while its forming in the forming pattern; and welding the cutting segments, by said heating, to the periphery of the steel core placed at the lower portion of the forming pattern of the lower die assembly.

Further, according to a preferred embodiment of the present invention, there is provided a method for manufacturing cutting blades, which performs concurrently the steps of forming the diamond-metal powder mixture into cutting segments by pressing the mixture filled in the forming pattern of the forming die, sintering the metal powder in the diamond-metal powder mixture of the cutting segments by heating the diamond-metal powder mixture, and welding the cutting segments, by heating, to a predetermined portion of the periphery of the disk-shaped steel core.

Still further, according to the present invention, there is provided a method for manufacturing cutting blades, comprising a step of welding a plurality of cutting segments in order throughout the periphery of the disk-shaped steel core by stepwise rotating the steel core at a predetermined angle.

In applying the method for manufacturing cutting blades of the present invention, preferably, the diamond-metal powder mixture is composed of metal powder of a predetermined ingredient and size and diamond-metal powder granules preformed by coating the metal powder of a predetermined ingredient and size around the diamond particles of a predetermined size.

According to another aspect of the present invention, there is provided an apparatus for manufacturing cutting blades, each having a disk-shaped steel core with a predetermined thickness and a plurality of cutting segments made of a mixture of diamond particles and metal powder and fixedly attached to the periphery of the steel core at regular intervals, comprising: at least one vertically reciprocating upper punch; a lower die assembly having at least one forming pattern of a cross-sectional shape corresponding to the upper punch for filling the mixture of the diamond particles and the metal powder therein and forming the mixture into a predetermine shape; and a supporting device for supporting the disk-shaped steel core having a predetermined periphery thereof positioned at the lower portion of the forming pattern of the lower die assembly.

Further, according to a preferred embodiment of the present invention, there is provided a manufacturing apparatus, further comprising heating means for heating the diamond-metal powder mixture filled into the forming pattern of the lower die assembly. Preferably, the heating means is electric heating means. More preferably, the heating means comprises an induction-heating coil arranged outside of the forming pattern of the lower die assembly.

Still further, according to the present invention, there is provided a manufacturing apparatus, further comprising at least one cooling or heat sink means arranged under the lower portion of the forming pattern of the lower die assembly so as to be in contact with both or any one of the side surfaces of the disk-shaped steel core placed under the lower portion of the forming pattern of the lower die assembly.

Still further, according to the present invention, there is provided a manufacturing apparatus, further comprising rotating means for stepwise rotating the disk-shaped steel core at a predetermined angle so as to weld a plurality of cutting segments in order throughout the periphery of the steel core.

In manufacturing cutting blades using the apparatus of the present invention, preferably, the diamond-metal powder mixture is composed of metal powder of a predetermined ingredient and size and diamond-metal powder granules preformed by coating the metal powder of a predetermined ingredient and size around the diamond particles of a predetermined size.

According to a further aspect of the present invention, there is provided a cutting blade having a disk-shaped steel core with a predetermined thickness and a plurality of cutting segments made of a mixture of diamond particles and metal powder by forming and sintering the mixture in a predetermined shape and fixedly attached to the periphery of the steel core at regular intervals, wherein the cutting segments are made of a mixture of metal powder of a predetermined ingredient and size and diamond-metal powder granules preformed by coating the metal powder of a predetermined ingredient and size around the diamond particles of a predetermined size.

According to a still further aspect of the present invention, there is provided cutting segments made of a mixture of metal powder of a predetermined ingredient and size and diamond-metal powder granules preformed by coating the metal powder of a predetermined ingredient and size around the diamond particles of a predetermined size, by forming and sintering the mixture in a predetermined shape.

BRIEF DESCRIPTION OF THE DRAWINGS

The foregoing and other objects, features and advantages of the present invention will become more apparent from the following detailed description with reference to the accompanying drawings, in which.

DETAILED DESCRIPTION OF THE PREFERRED EMBODIMENT

A preferred embodiment of the present invention will be described herein below with reference to the accompanying drawings. In the following description, conventional functions or structures will not be described in detail, since they would be apparent to those skilled in the field of the present invention.

Figure 1:
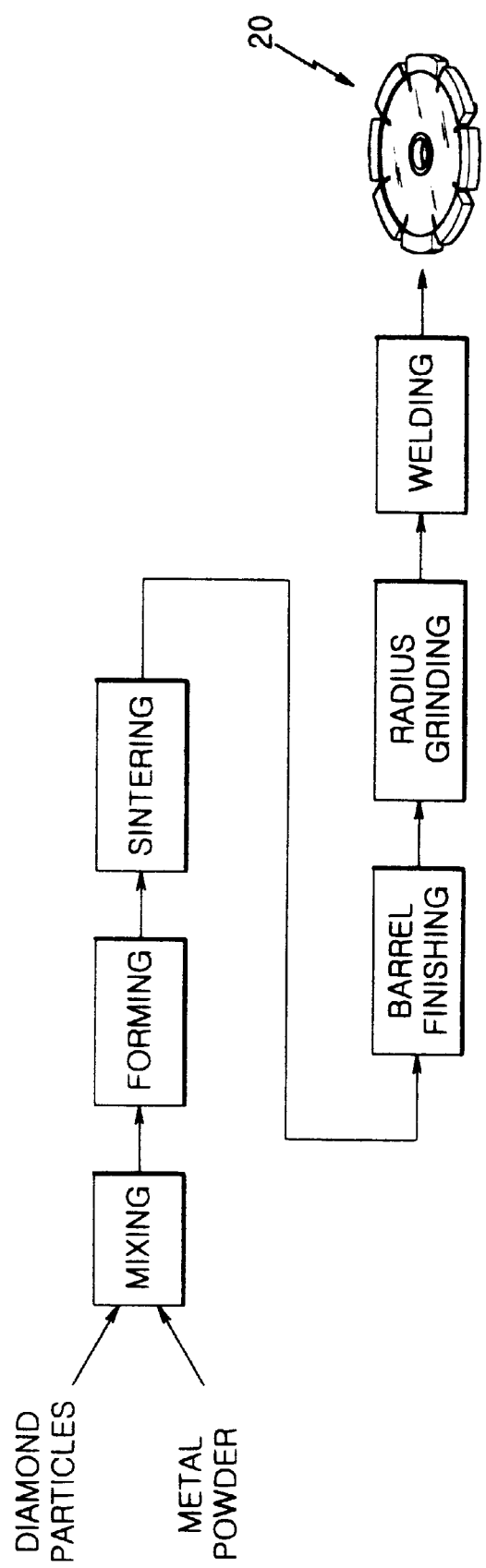
FIG. 1 is a block diagram illustrating the conventional method for manufacturing cutting blades related to the present invention.
Figure 2:
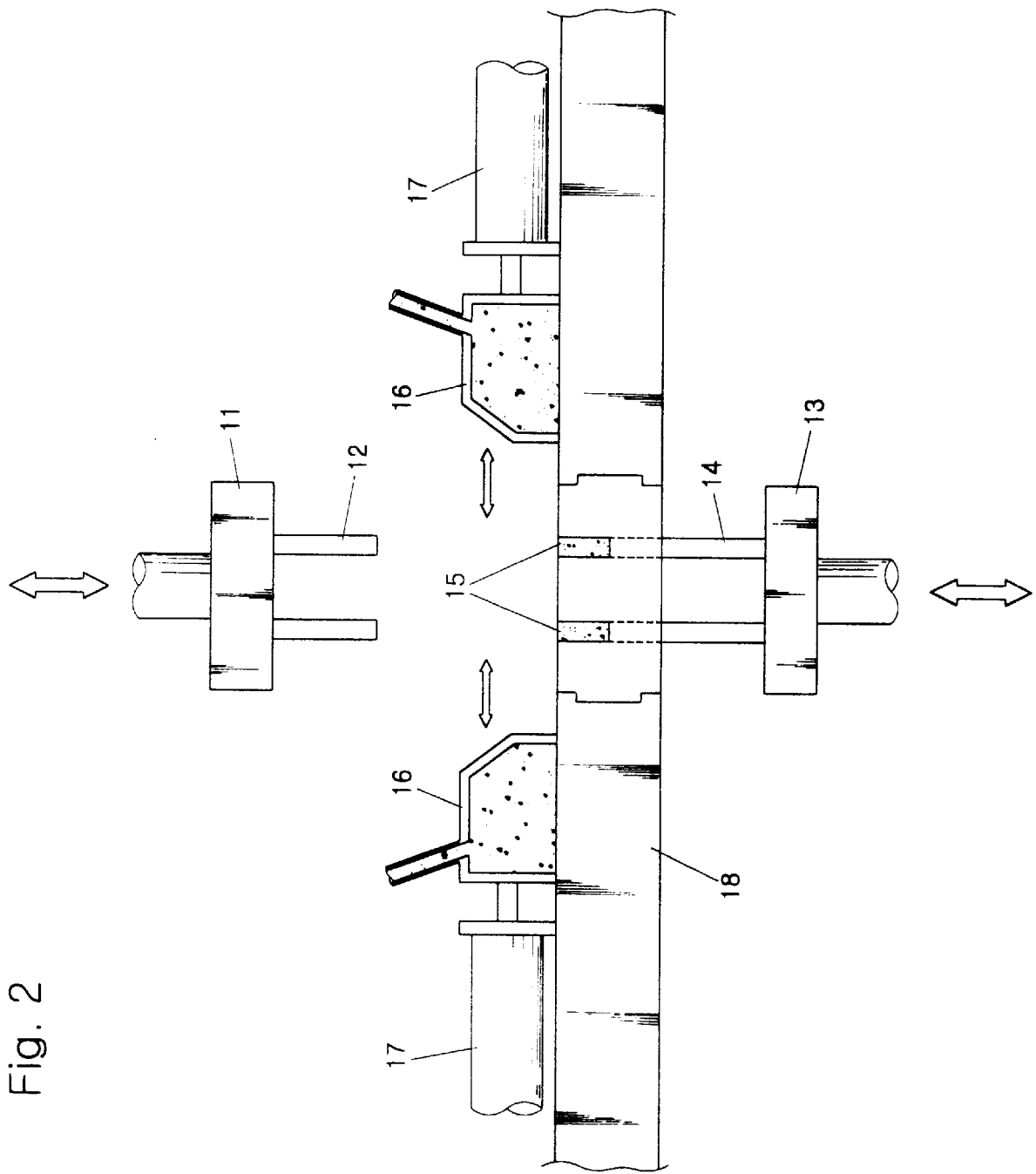
FIG. 2 is a schematic view of a forming die in the conventional apparatus for manufacturing cutting blades related to the present invention.
Figure 3:
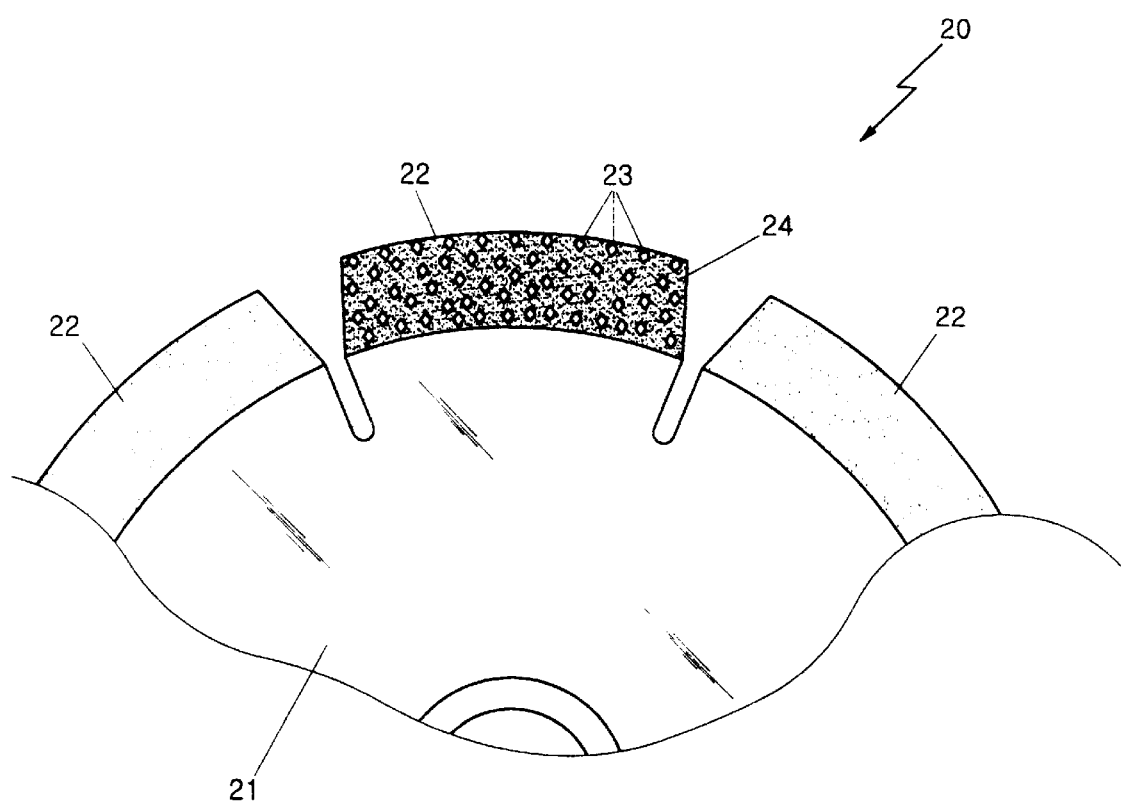
FIG. 3 is a sectional view illustrating the structure of one of the cutting segments in a conventional cutting blade.
Figure 4:
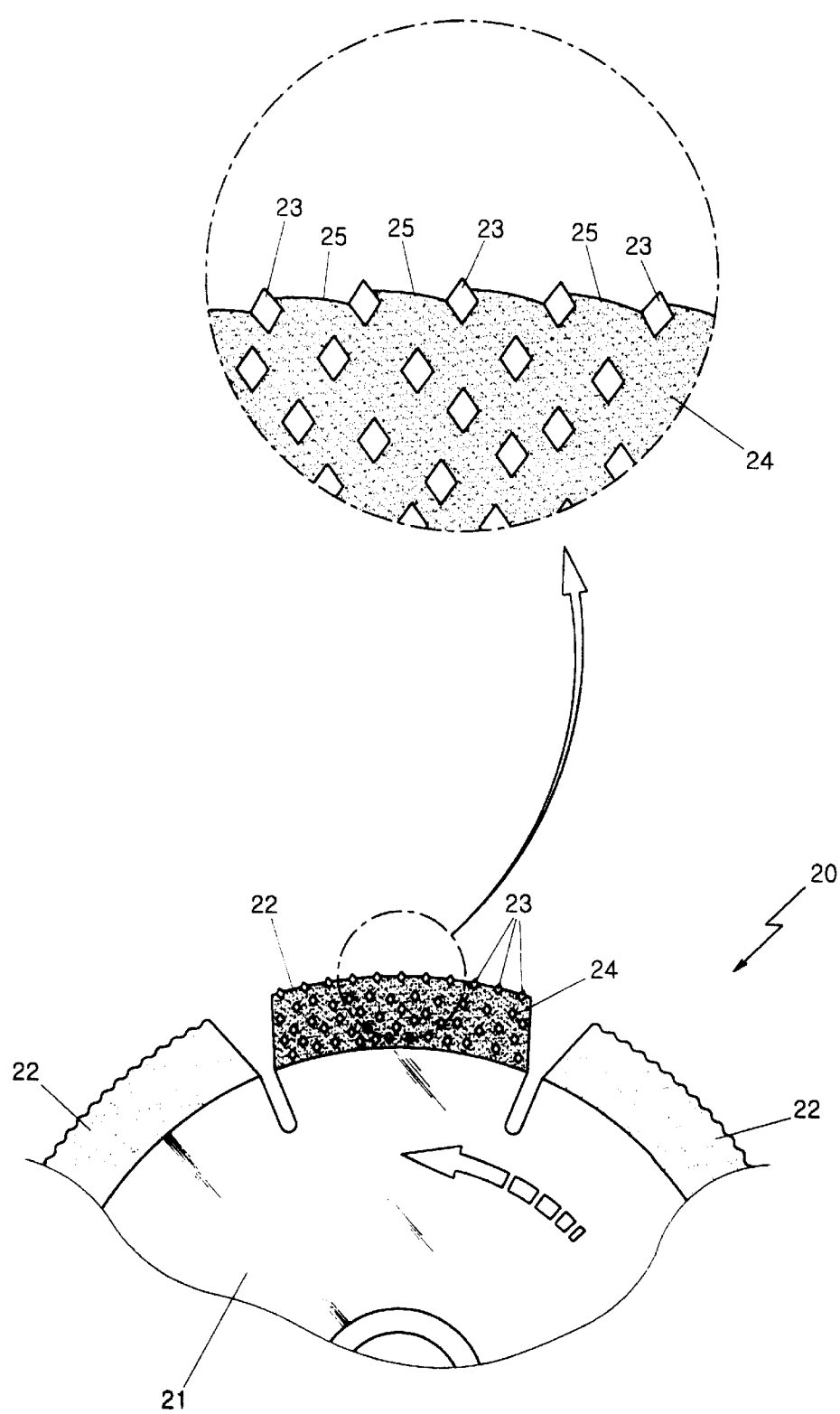
FIG. 4 is a partially enlarged sectional view showing an abrasive state of the cutting segments in the conventional cutting blade in use.
Figure 5:
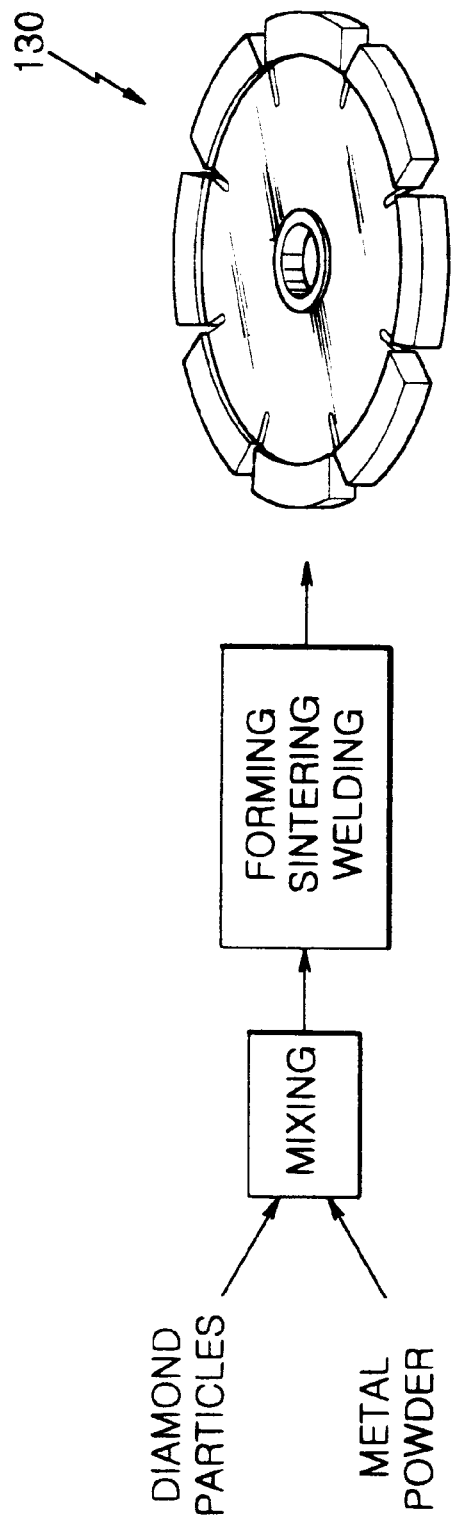
FIG. 5 is a block diagram illustrating a method for manufacturing cutting blades according to a preferred embodiment of the present invention.

Referring to FIG. 5 illustrating a method for manufacturing cutting blades according to a preferred embodiment of the present invention, as an initial step of manufacturing, a diamond-metal powder mixture is prepared by mixing diamond particles of a predetermined size and metal powder of a predetermined ingredient and size. At this time, diamond particles and metal powder to be mixed are measured in a necessary amount using ordinary measuring means, and mixed together using ordinary mixing means to have diverse mixing ratios depending on the necessary.

A disk-shaped steel core of the cutting blade is placed and supported under the lower portion of a forming die comprising at least one vertically reciprocating upper punch and a lower die assembly having at least one forming pattern of a cross-sectional shape corresponding to the upper punch for filling and forming the diamond-metal powder mixture therein. A predetermined amount of diamond-metal powder mixture prepared as described above is filled into the forming pattern of the forming die, and then pressed by the upper punch so as to be formed in a predetermined shape, i.e., in the shape of a cutting segment. The cross-sectional shape of each of the upper punch and the forming pattern accords with that of the cutting segment to be formed. As described above, if the disk-shaped steel core is placed and supported under the lower portion of the forming pattern of the lower die assembly before filling the diamond-metal powder mixture into the forming pattern, a part of the periphery of the disk-shaped steel core is positioned in the lower portion of the forming pattern instead of a lower punch of the conventional lower press.

According to a preferred embodiment of the present invention, when forming the diamond-metal powder mixture into a cutting segment of a predetermined shape in the forming pattern of the forming die by pressing the mixture with the upper punch, by simultaneously heating the mixture by a suitable heating means, the metal powder in the diamond-metal powder mixture is sintered and, at the same time, the cutting segment is welded to the periphery of the disk-shaped steel core which has been placed in advance as described above under the lower portion of the forming pattern. Thus, in the present invention, simultaneously performing the forming, sintering and welding in a step, it is possible to shorten the manufacturing process and further it is unnecessary to perform the barrel finishing or radius grinding of the conventional method.

As the heating means, as will be described later in relation to the manufacturing apparatus of the present invention, preferably, an electric heating means is used and, more preferably, an electric coil arranged outside of the forming pattern of the lower die assembly is used so as to inductively heat the diamond-metal powder mixture in the forming pattern. A predetermined AC voltage is applied to the electric coil during the heating from a separate power supply installed outside of the forming die. The applied AC voltage may be ranged, for example, between 5 kV–30 kV with 100 kHz–350 kHz. However, the present invention is not limited to this range.

Another available electric heating means may be a power supply which applies a DC voltage to the diamond-metal powder mixture in the forming pattern of the lower die assembly via the upper punch of the forming die when pressing and forming the mixture into the cutting segments. When using a DC power supply, as an example, the applied DC voltage may be ranged between 5V–30V with a current of 3 kA–20 kA. However, the present invention is not limited to this example. The time period to apply such an AC or a DC voltage would be, for example, about 5 to 30 seconds. However, the present invention is not limited to this example, either.

When electrically heated as described above, the temperature of the diamond-metal powder mixture in the forming pattern reaches to about 600° C.–1200° C. and, as a result, the metal powder is sintered and the cutting segments are welded to the periphery of the disk-shaped steel core which has been placed in advance under the lower portion of the forming pattern of the lower die assembly. If an electric coil is used in this case, a considerable amount of heat is transmitted to the coil. Further, a high temperature of heat is transmitted to the disk-shaped steel core to which the cutting segments are welded. Hence, due to the high temperature of heat, it is likely that the coil is thermally deformed and the disk-shaped steel core is also thermally deformed or annealed, thereby experiencing damages such as distortion, strength weakening, etc. In order to prevent such a possible deformation or annealing, it is preferable to cool the coil and the disk-shaped steel core and to do so, preferably, the coil is made in a hollow type of a rectangular shape through which cooling water can be flowed, and cooling or heat sink means is arranged to contact with both or any one of the side surfaces of the disk-shaped steel core placed under the lower portion of the forming pattern.

Subsequent to forming and sintering the diamond-metal powder mixture into a cutting segment in the forming pattern, once the cutting segment is completely welded to the periphery of the disk-shaped steel core placed in advance under the lower portion of the lower die assembly, the disk-shaped steel core is rotated at a predetermined angle and another cutting segment is formed, sintered and welded to the next position of the periphery in the same process as described above. Repeating the process, a cutting blade is completely manufactured having a plurality of cutting segments welded in order throughout the entire periphery of the disk-shaped steel core.

In applying the method for manufacturing cutting blades of the present invention, preferably, the diamond-metal powder mixture is composed of metal powder of a predetermined ingredient and size and diamond-metal powder granules preformed by coating metal powder of a predetermined ingredient and size around diamond particles of a predetermined size.

As an example, the diamond-metal powder granules would be formed by coating metal powder having a particle size of 0.5 μm–200 μm around core diamond particles having a particle size of 1 μm–8000 μm, respectively. However, the present invention is not limited to this example.

A process of producing the diamond-metal powder granules, for example, comprises: putting diamond particles of a predetermined size into a chamber (not shown) of a closed funnel shape, floating upward the diamond particles within the chamber by blowing air into the chamber in a high speed from an air injection inlet provided at the bottom of the chamber, and spraying metal powder of a predetermined ingredient and size together with a filler material into the chamber in a high speed through a nozzle mounted at the upper portion of the chamber, thereby the metal powder being uniformly coated around the core diamond particles floated in the chamber. In this manner, it is possible to obtain diamond-metal powder granules of an almost uniform size. If necessary, more uniform diamond-metal powder granules can be obtained by sifting them using a sieve having a predetermined mesh size.

The diamond-metal powder granules formed as described above, by coating the metal powder of a predetermined ingredient and size around the core diamond particles of a predetermined size may have, after sintered, a higher hardness than the ordinary sintered diamond-metal powder mixture. For instance, the diamond-metal powder granules have a Rockwell hardness of $H_RC$ 1–60 after sintered. As a consequent, a cutting segment manufactured by forming and sintering a mixture of metal powder and diamond-metal powder granules into a predetermined shape has a Rockwell hardness of $H_RC$ 1–60 in its entirety.

Figure 6:
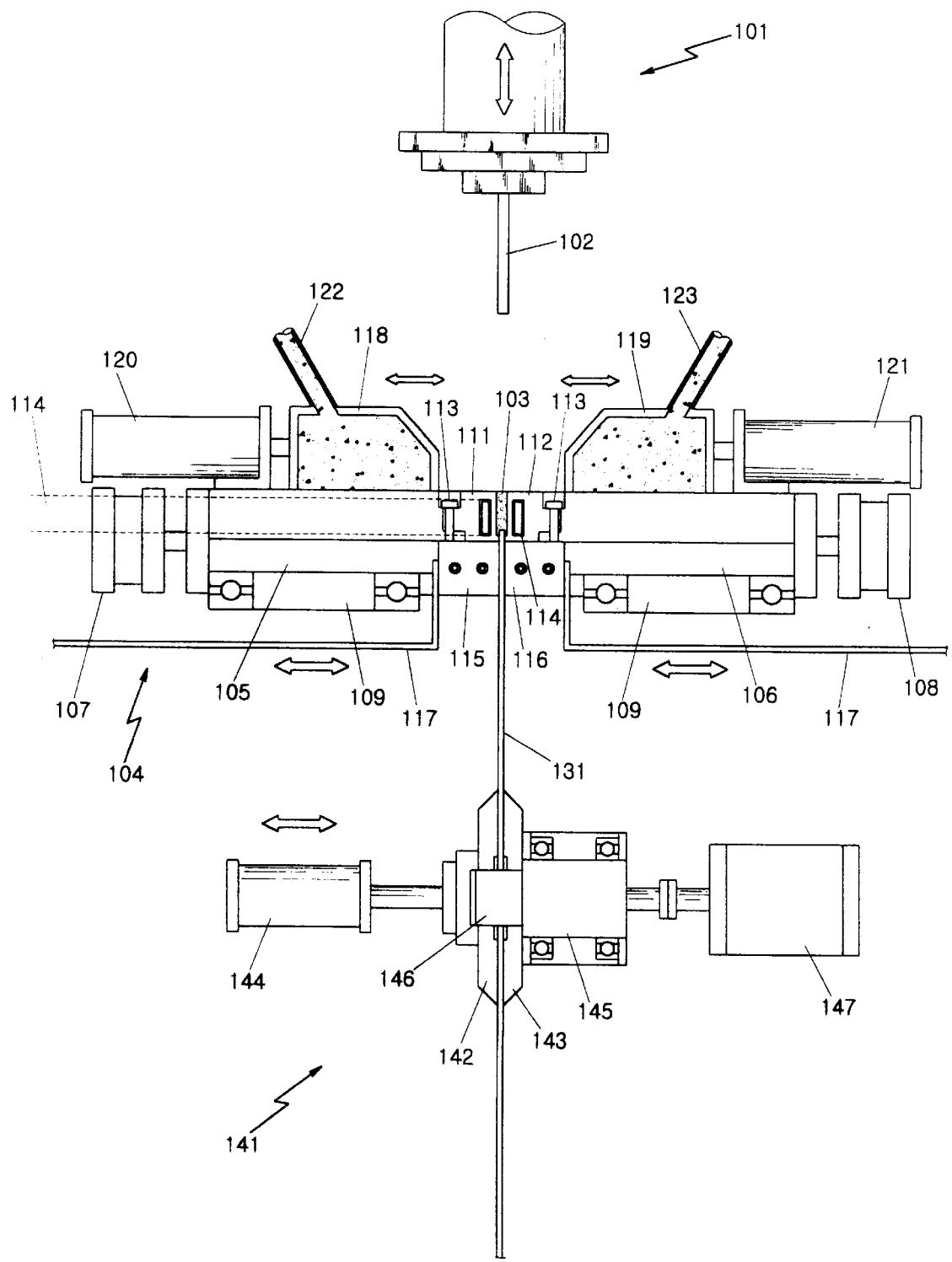
FIG. 6 is a partial sectional schematic view showing the structure of an apparatus for manufacturing cutting blades according to a preferred embodiment of the present invention.

FIG. 6 is a schematic view showing the structure of an apparatus for manufacturing cutting blades according to a preferred embodiment of the present invention. Although several parts and accessories used in general in the field related to the present invention are not illustrated in the drawings, it is understood that those parts and accessories can be incorporated into a part of the apparatus of the present invention.

As shown in FIG. 6, the manufacturing apparatus of the present invention comprises an upper punch assembly 101 having at least one punch 102, and a lower die assembly 104 having at least one forming pattern 103 which has a cross sectional shape corresponding to the upper punch 102 and in which a diamond-metal powder mixture is filled and formed into a predetermined shape. Under the lower die assembly 104, a steel core supporting device 141 is positioned to support a disk-shaped steel core 131 in place under the lower portion of the forming pattern and to stepwise rotate the steel core at a predetermined angle after one cutting segment is welded to the periphery of the steel core in the manufacturing process. Although not shown in the drawings, means for supporting the entire lower die assembly and for adjusting the height of the lower die assembly when necessary is arranged under the left and right sides of the lower die assembly 104.

Although the apparatus of the present invention as shown has only one of each of the upper punch 102 and the forming pattern 103, it is obvious to those skilled in the art of the present invention that the apparatus may have a plurality of each of the upper punch and the forming pattern. Also, although not shown in the drawings, the upper punch assembly 101 is connected to a press so as to be vertically reciprocated thereby.

In the forming process, the upper punch assembly 101 can be vertically reciprocating by the press connected to the upper portion thereof and, accordingly, the punch 102 can enters into and exits from the forming pattern 103.

The lower die assembly 104 has a left die assembly 105 and a right die assembly 106. These left and right die assemblies 105, 106 are reciprocating in a horizontal direction for a predetermined distance by hydraulic cylinders 107, 108 connected to the respective external end. Such reciprocation is lineally effected in a horizontal direction by virtue of a linear motion guide 109 installed at the lower portion of the left and right die assemblies 105, 106. Left and right forming dies 111, 112 are detachably mounted insides of the left and right die assemblies 105, 106, respectively. A recess is formed on the respective inner surface of the left and right forming dies 111, 112 so as to form a forming pattern 103 when the forming dies move toward each other and contact fluid-tightly. Further explanation in this regard will be provided with reference to FIGS. 7 and 8.

The left and right forming dies 111, 112 are detachably mounted insides of the left and right die assemblies 105, 106, respectively, by conventional fastening means such as bolts 113. An electric coil 114, which is heating means for heating the diamond-metal powder mixture in the forming pattern 103 in the forming process, is arranged to penetrate the respective body of the left and right forming dies 111, 112. The electric coil 114 is a rectangular shaped coil of a hollow type made of copper, and cooling water is supplied into the hollow inside of the coil in the forming process. Both ends of the electric coil are connected to an AC power supply (not shown). The AC power supply is one easily available such as an inverter of high frequency, medium frequency or low frequency. In the example shown in the drawings, although one electric coil 114 has been arranged to surround one forming pattern 103, it is understood that, when the forming die has two or more forming patterns, a further electric coil of identical with or similar to the electric coil 114 may be arranged for each of the forming patterns.

As cooling or heat sink means, left and right cooling blocks 115, 116 are arranged beneath the left and right forming dies 111, 112. A flexible pipe 117 is connected to the respective cooling block to supply cooling water from a separate cooling water supply source (not shown). If necessary, any one of the left and right cooling blocks 115, 116 may be omitted. In addition, in the example illustrated in the drawings, although two cooling blocks have been arranged to be in contact with the left and right surfaces of one disk-shaped steel core, it is understood that, when two or more steel cores are placed under the forming die which has two or more forming patterns, further cooling blocks having a structure identical with or similar to the cooling blocks 115, 116 may be arranged between those steel cores.

Placed on the upper surfaces of the left and right die assemblies 115, 116 are left and right filling feeders 118, 119 which are reciprocating in a horizontal direction by the hydraulic cylinders 120, 121 installed near the respective outside end. In the forming process, the filling feeders 118, 119 are supplied with diamond particles, metal powder or a mixture thereof from a forming material supply source (not shown) through conduits 122, 123 thereof.

The steel core supporting device 141 positioned below the lower die assembly 104 comprises left and right supporting blocks 142, 143, a hydraulic cylinder 144 for reciprocating the left supporting block 142 in a horizontal direction when supporting in place and removing the disk-shaped steel core 131, a supporting axis 146 inserted into the center hole of the steel core and rotationally supported by a bearing 145, and a stepping motor 147 for stepwise rotating the axis 146 at predetermined angle. In the example shown in the drawings, although one disk-shaped steel core is supported by the left and right supporting blocks 142, 143, it is understood that, when the forming die has two or more forming patterns, two or more steel cores placed under the forming die corresponding to the number of the forming patterns can be supported to have same intervals as the forming patterns by the supporting device, for example, which has the left and right supporting blocks and further intermediate supporting blocks or spacers sandwiched between the steel cores.

Figure 7:
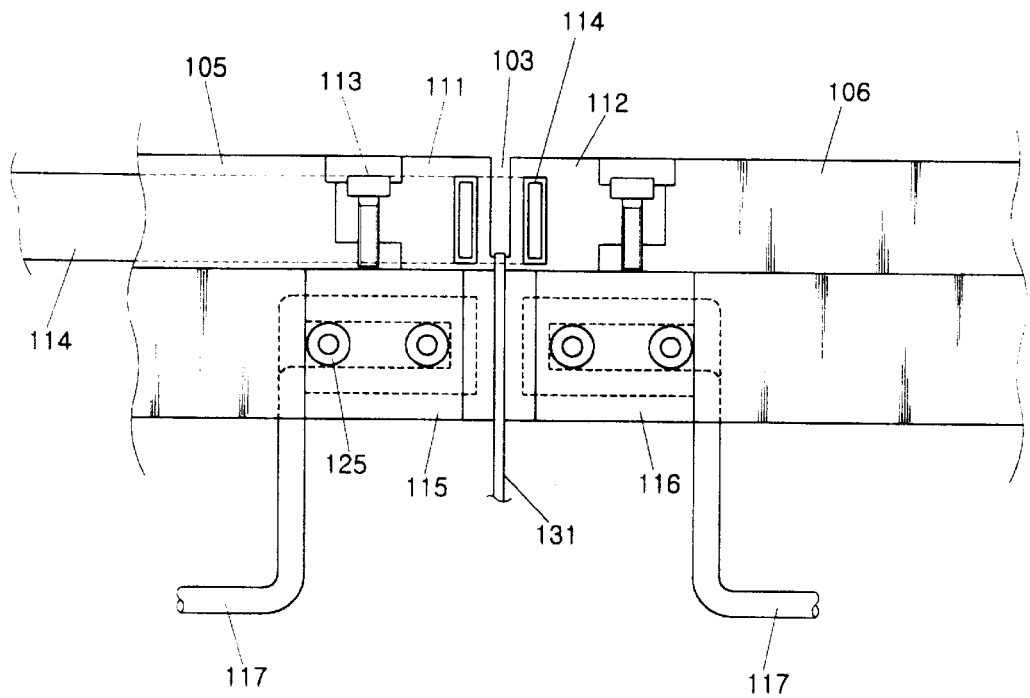
FIG. 7 is an enlarged sectional view partially depicting the apparatus for manufacturing cutting blades according to a preferred embodiment of the present invention.

FIG. 7 is a partially enlarged sectional view showing in detail the left and right forming dies 111, 112 and left and right cooling blocks 115, 116 mounted beneath the forming dies.

As shown in FIG. 7 and as described above, the left and right forming dies 111, 112 are detachably mounted insides of the left and right die assemblies 105, 106, respectively, by conventional fastening means such as bolts 113. The left and right forming dies 111, 112 can be easily removed when repairing, or easily replaced with those of different size when forming cutting segments of different size depending on the kinds of cutting blade.

As described above, a recess is formed on the respective inner surface of the left and right forming dies 111, 112 so as to form a forming pattern 103 when the forming dies move toward each other and contact fluid-tightly. An electric coil 114 for heating the diamond-metal powder mixture in the forming pattern 103 in the forming process is arranged to penetrate the respective body of the left and right forming dies 111, 112.

Left and right cooling blocks 115, 116 are arranged beneath the left and right forming dies 111, 112, as described above, to which a flexible pipe 117 is connected to supply cooling water from a separate cooling water supply source. The cooling blocks 115, 116 are preferably made of copper having good heat conductivity, while other metal or alloy having superior heat conductivity may be used to make the cooling blocks. The inner surfaces of the cooling blocks 115, 116 are closely contacted with the outer surfaces of the disk-shaped steel core 131 so as to support the steel core in place and at the same time cool the heat of high temperature transmitted to the steel core from the forming pattern. The cooling blocks 115, 116 are mounted on the die assemblies by bolts 125, etc. so as to be easily detachable from the die assemblies when necessary to repair or replace them.

Figure 8:
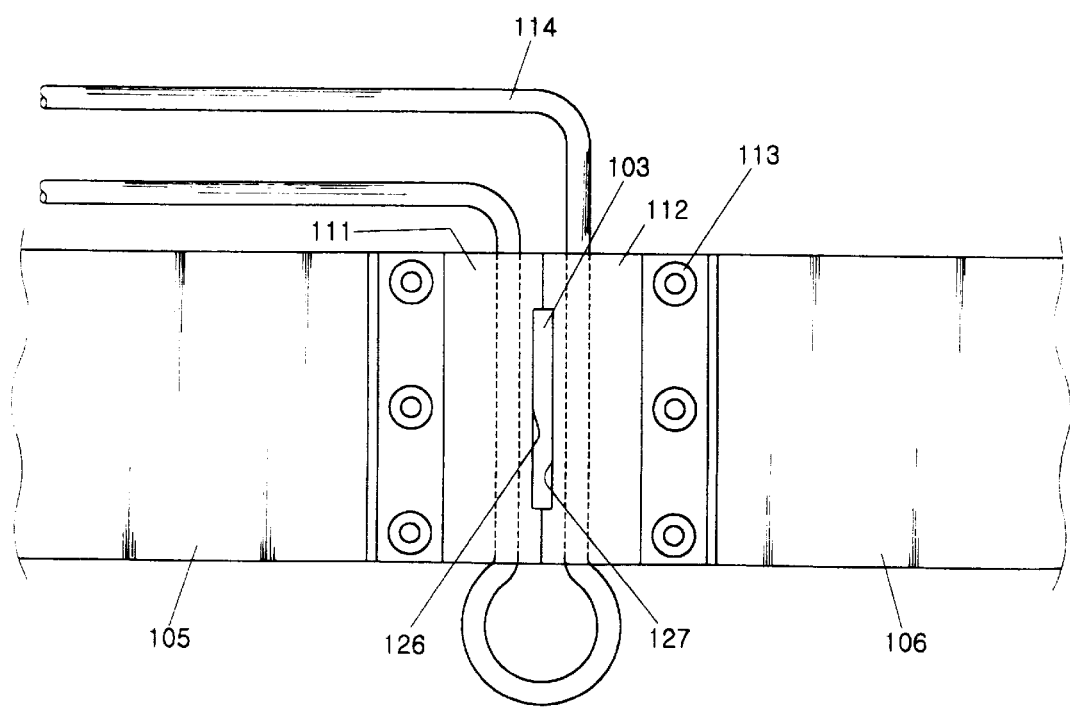
FIG. 8 is a schematic top-plan view illustrating an example of arranging heating means for sintering and welding the cutting segments in the apparatus for manufacturing cutting blades according to the present invention.
Figure 9:
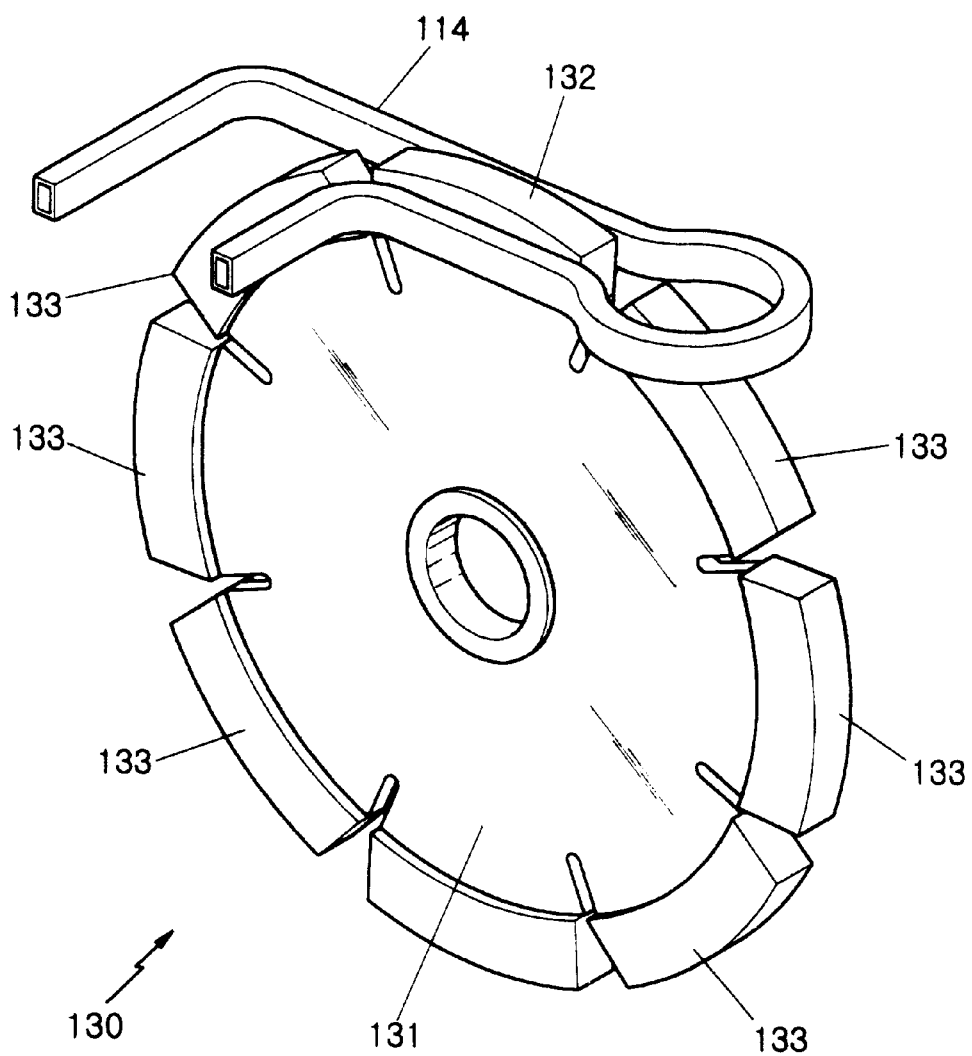
FIG. 9 is a perspective view illustrating only the heating means and a cutting blade with eliminating other structures to simply show the relative arrangement to each other in the manufacturing process.

FIG. 8 is a schematic top-plan view illustrating an example of arranging the electric coil for heating the cutting segments in the forming dies so as to perform the sintering and welding process. FIG. 9 is a perspective view showing a relative arrangement between the electric coil illustrated on FIG. 8 and cutting segments of a cutting blade.

As shown in FIG. 8, the electric coil 114 is arranged to penetrate the bodies of the left and right forming dies 111, 112 so as to be positioned adjacently to the forming pattern 103 formed by the recesses 126, 127 of the left and right forming dies 111, 112. The penetrating paths of the electric coil in the forming dies are shown in dotted lines. Of course, the electric coil 114 is insulated from the left and right forming dies 111, 112 using any suitable insulating means (not shown) when penetratingly arranged in the forming dies.

As schematically shown in FIG. 9, the electric coil 114 is arranged to surround the external surface of a cutting segment 132 being welded to the periphery of the disk-shaped steel core 131 of a cutting blade so as to inductively heat the metal powder of the diamond-metal powder mixture constituting the cutting segment 132. The bending portion of the coil surrounding the cutting segment 132 is protruded as a ring shape as shown in the drawings so as to prevent the coil from contacting with the cutting segment 133 already formed and welded to the periphery of the disk-shaped steel core 131 and positioned in front of the cutting segment 132 under forming process at present.

Now, a process of manufacturing a cutting blade by using the manufacturing apparatus of the present invention will be described in brief. The manufacturing apparatus according to the present invention is programmed so that the entire steps of manufacturing can be automatically performed, while semiautomatic or manual operation of the apparatus is also possible.

First, a diamond-metal powder mixture is prepared by mixing diamond particles of a predetermined size and metal powder of a predetermined ingredient and size. The diamond-metal powder mixture is filled in a forming material supply source (not shown) and is supplied to the filling feeders 118, 119. When the apparatus of the present invention is operated, the forming material, i.e., the diamond-metal powder mixture, supplied to the filling feeders 118, 119 is filled into the forming pattern 103 formed as a result of tight contact of the left and right forming dies 111, 112, by the filling feeders 118, 119 horizontally reciprocating by the hydraulic cylinders 120, 121. Prior to filling the diamond-metal powder mixture into the forming pattern 103, the disk-shaped steel core 131 is placed under the forming dies 111, 112 and supported by the supporting device 141, so that a predetermined peripheral part of the steel core 131 can be positioned inside of the lower portion of the forming dies 111, 112.

After the diamond-metal powder mixture is filled into the forming pattern 103, the upper punch assembly 101 descends and the punch 102 thereof enters into the forming pattern 103 so as to apply a pressure to the diamond-metal powder mixture in the forming pattern 103 and form the mixture into a cutting segment of a desired shape. At the same time of this forming process, an electric power is applied to the electric coil 114 arranged to penetrate the left and right forming dies 111, 112 so as to inductively heat the diamond-metal powder mixture in the forming pattern 103. By the induction heating, the metal powder in the diamond-metal powder mixture is sintered at a high temperature and simultaneously the formed cutting segment is welded to the periphery of the disk-shaped steel core 131 placed in advance under the lower portion of the forming pattern.

During the induction heating, the diamond-metal powder mixture is heated at a high temperature, for example, about 600° C.–1200° C. However, such a high temperature is undesirably transmitted to the electric coil 114 as well as to the disk-shaped steel core 131. In order to cool the electric coil 114 and the steel core 131 heated by the undesirably transmitted high temperature, cooling water flows inside of the electric coil 114 and the cooling blocks 115, 116, as described above.

Once a cutting segment is completely welded to the periphery of the disk-shaped steel core 131, a stepping motor 147 of the supporting device 141 positioned below the die assembly and supporting the steel core 131 rotates at a predetermined angle, and consequently the steel core 131 rotates at a predetermined angle. Then, a series of process for forming, sintering and welding the cutting segments to the next positions of the periphery of the steel core 131 is repeatedly performed in the order as described above, according to a programmed continuous operation sequence. As a result, a plurality of cutting segments is completely welded throughout the periphery of the disk-shaped steel core 131.

Figure 10:
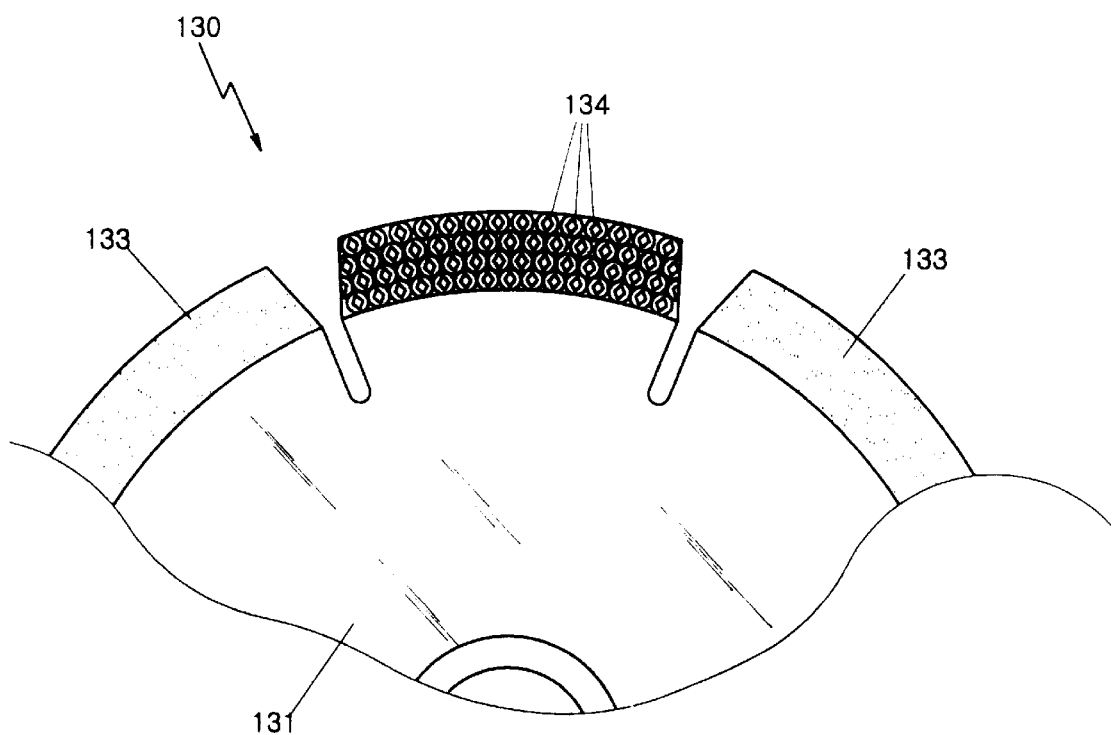
FIG. 10 is a sectional view illustrating the structure of one of the cutting segments in a cutting blade according to a preferred embodiment of the present invention.

FIG. 10 is a sectional view illustrating the structure of a cutting segment in a cutting blade as produced according to a preferred embodiment of the present invention, using a mixture of metal powder and diamond-metal powder granules.

The diamond-metal powder granules have a regular size as described previously. Therefore, as shown in FIG. 10, the sintered diamond-metal powder granules 134 are uniformly distributed inside of the cutting segments 133 of the cutting blade 130 completed through a series of forming, sintering and welding steps. In case of sintering the cutting segments formed with a mixture of metal powder and diamond-metal powder granules, the metal powder in the mixture is wholly sintered and at the same time the metal powder surrounding the core diamond particles in the granules is sintered to a predetermined depth, since the diamond-metal powder granules are instantaneously heated at the temperature ranged 600° C.–1200° C. by the induction heating as described above. Thus, the diamond particles are rarely affected from the high temperature.

As an example, the diamond-metal powder granules are formed by coating metal powder having a particle size ranged 0.5 $\mu$m–200 $\mu$m around the core diamond particles having a particle size ranged 1 $\mu$m–8000 $\mu$m. These diamond-metal powder granules have a Rockwell hardness of $H_RC$ 1–60 after sintered. As a result, a cutting segment manufactured by forming and sintering a mixture of metal powder and diamond-metal powder granules into a predetermined shape has a Rockwell hardness of $H_RC$ 1–60 in its entirety.

The metal used for manufacturing the diamond-metal powder mixture or granules contains, for example, at least one of cobalt, iron or tungsten as a main ingredient, and additionally contains at least one of copper, tin, copper-tin alloy, nickel or titanium.

Figure 11:
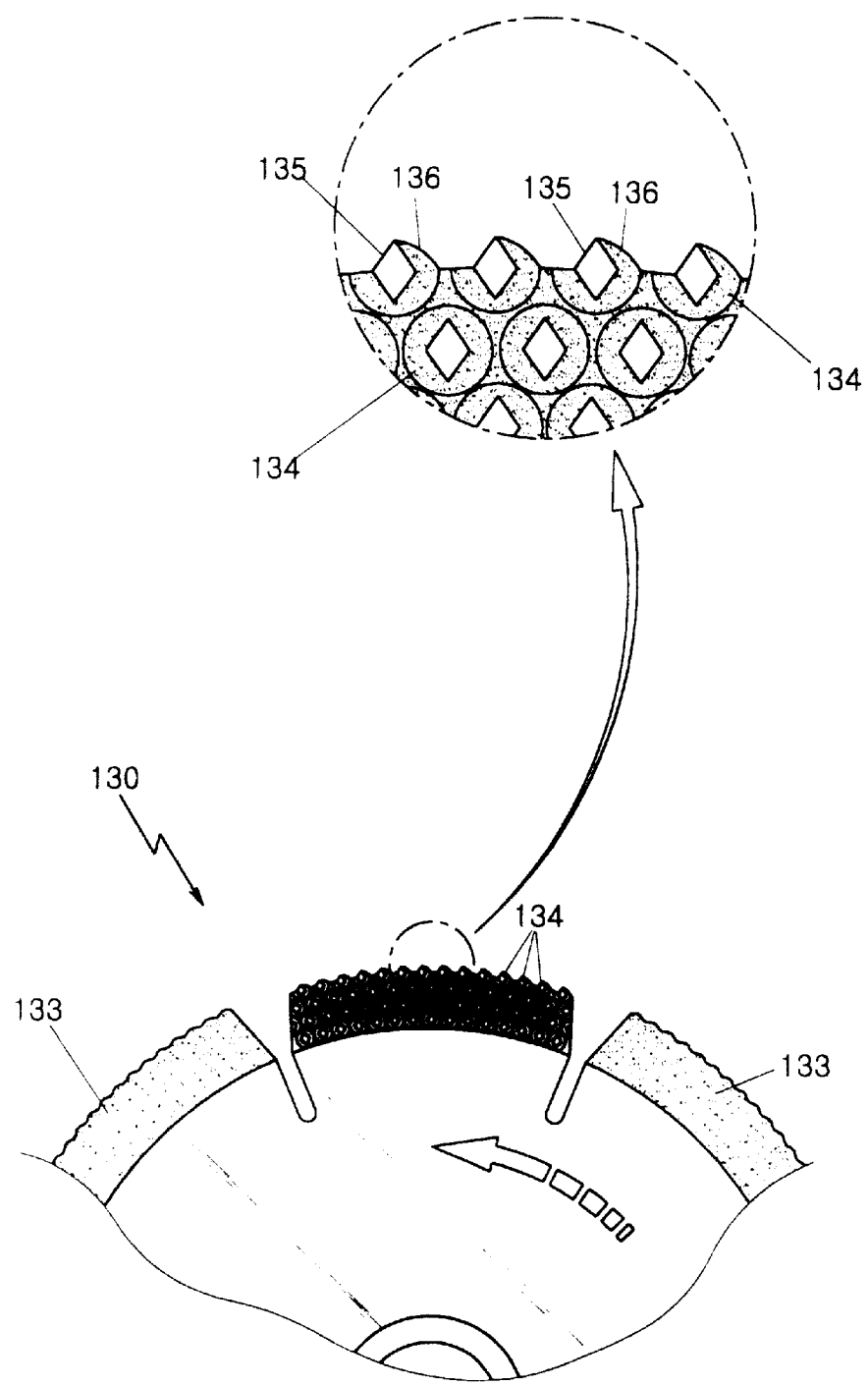
FIG. 11 is a partially enlarged sectional view showing an abrasive state of the cutting segments in the cutting blade according to a preferred embodiment of the present invention.

FIG. 11 is a partially enlarged sectional view showing an abrasive state of the cutting segments in use, which have been made according to a preferred embodiment of the present invention. As shown, the heights of the diamond particles exposed from the abraded surfaces of the cutting segments 133 are almost regular after use of the cutting blade 130 for a long period of time.

Further, in the diamond-metal powder granules 134, the sintered metal powder crusting a core diamond particle 135 has a high hardness and, since the diamond-metal powder granules have been integrally sintered, a binding force between the diamond particles and the sintered metal powder is superior. Accordingly, even if the diamond granules exposed from the surfaces of the cutting segments 133 rotating in an arrow direction are abraded in use, the residual powder layers 136 of the sintered metal powder in the granules, surrounding behind the core diamond particles 135, are maintained for a considerable period of time, thereby supporting the core diamond particles 135 for a considerable period of time. In fact, the core diamond particles 135 of the granules exposed from the cutting segments in the cutting process are almost maintained without falling off until the exposed size of the core diamond particles 135 reaches about ⅗.

As described above, the present invention provides a method for manufacturing cutting blades within a short period of time and with low manufacturing cost, by drastically shortening the manufacturing process, since the steps of forming, sintering and welding of the cutting segments can be performed concurrently.

The present invention also provides an apparatus for manufacturing cutting blades requiring relatively small space for installation and capable of economically manufacturing cutting blades with a simple manufacturing process, by using not separate and independent manufacturing facilities but a single manufacturing facility.

The present invention further provides a cutting blade having uniform distribution of diamond particles in the sintered diamond-metal powder mixture, and in which diamond particles exposed due to abrasion of the cutting segments after long time use are not easily fallen off from the cutting segments.

While the invention has been shown and described with reference to a preferred embodiment thereof, it will be understood by those skilled in the art that various changes in form and details may be made therein without departing from the spirit and scope of the invention as defined by the appended claims.

What is claimed is:

1. A method for manufacturing cutting blades each having a disk-shaped steel core with a determined thickness and a plurality of cutting segments made of a mixture of diamond particles and metal powder and fixedly attached to the periphery of the steel core at regular intervals, the method comprising the steps of:

preparing a diamond-metal powder mixture by mixing diamond particles of a predetermined size with metal powder of a predetermined ingredient and size;

supporting the disk-shaped steel core under the lower portion of a forming die consisting of at least one vertically reciprocating upper punch and a lower die assembly having at least one forming pattern of a cross-sectional shape corresponding to the upper punch;

forming the diamond-metal powder mixture into cutting segments of a predetermined shape by filling a predetermined amount of the mixture into the forming pattern of the forming die and pressing the mixture in the forming pattern;

sintering the metal powder in the diamond-metal powder mixture of the cutting segments by heating the mixture while its forming in the forming pattern; and welding the cutting segments, by said heating, to the periphery of the disk-shaped steel core placed at the lower portion of the forming pattern of the lower die assembly.

2. The method of claim 1, wherein performs concurrently the steps of forming the diamond-metal powder mixture into cutting segments by pressing the mixture filled in the forming pattern of the forming die, sintering the metal powder in the diamond-metal powder mixture of the cutting segments by heating the diamond-metal powder mixture, and welding the cutting segments, by heating, to a predetermined portion of the periphery of the disk-shaped steel core.

3. The method of claim 1 or 2, comprising a step of welding a plurality of cutting segments in order throughout the periphery of the disk-shaped steel core by stepwise rotating the steel core at a predetermined angle.

4. The method of claim 1 or 2, wherein the heating is an electric heating.

5. The method of claim 4, wherein the electric heating is performed by applying an AC voltage to a coil arranged adjacent to the outside of the forming pattern of the lower die assembly of the forming die.

6. The method of claim 4, wherein the electric heating is performed by a DC voltage applied to the diamond-metal powder mixture in the forming pattern of the lower die assembly via the upper punch of the forming die when pressing and forming the mixture into the cutting segments.

7. The method of claim 1, wherein the diamond-metal powder mixture is composed of metal powder of predetermined ingredient and size and diamond-metal powder granules formed by coating metal powder of a predetermined ingredient and size around diamond particles of a predetermined size.

8. An apparatus for manufacturing cutting blades each having a disk-shaped steel core of a predetermined thickness and a plurality of cutting segments made of a mixture of diamond particles and metal powder and fixedly attached to the periphery of the steel core at regular intervals, the apparatus comprising:

at least one vertically reciprocating upper punch;

a lower die assembly having at least one forming pattern of a cross-sectional shape corresponding to the upper punch for filling the mixture of diamond particles and metal powder therein and forming the mixture into a predetermined shape;

a supporting device for supporting the disk-shaped steel core having a predetermined periphery thereof positioned at the lower portion of the forming pattern of the lower die assembly; and a heating means for heating the diamond-metal powder mixture filled into the forming pattern of the lower die assembly.

9. The apparatus of claim 8, further comprising at least one filling feeder for filling diamond particles, metal powder or a mixture thereof into the forming pattern while reciprocating in a horizontal direction on the top surface of the lower die assembly.

10. The apparatus of claim 8, wherein the heating means is electric heating means.

11. The apparatus of claim 8 or 10, wherein the heating means comprises an induction-heating coil arranged adjacent to outside of the forming pattern of the lower die assembly.

12. The apparatus of claim 8 or 10, wherein the heating means is a DC power supply applied to the diamond-metal powder mixture in the forming pattern of the lower die assembly via the upper punch when pressing and forming the mixture into the cutting segments.

13. The apparatus of claim 8, further comprising at least one cooling or heat sink means arranged under the lower portion of the forming pattern of the lower die assembly so as to be in contact with both or any one of the left and right surfaces of the disk-shaped steel core placed under the lower portion of the forming pattern of the lower die assembly.

14. The apparatus of claim 8, wherein the supporting device for supporting the disk-shaped steel core includes a rotating means so as to stepwise rotating the steel core at a predetermined angle.

* * * * *